United States Patent

[11] 3,525,316

| [72] | Inventor | William M. McWilliam<br>935 Harding Drive, New Orleans,<br>Louisiana 70119 |
|---|---|---|
| [21] | Appl. No. | 707,764 |
| [22] | Filed | Feb. 23, 1968 |
| [45] | Patented | Aug. 25, 1970 |

[54] SYSTEM FOR MECHANICALLY CLEANING BOILERS
16 Claims, 5 Drawing Figs.

| [52] | U.S. Cl. | 122/381 |
|---|---|---|
| [51] | Int. Cl. | F22b 37/54 |
| [50] | Field of Search | 122/381, 383, 389, 379 |

[56] References Cited
UNITED STATES PATENTS

| 1,888,515 | 11/1932 | Stockholder | 122/381 |
|---|---|---|---|
| 1,914,744 | 6/1933 | Hurd | 122/381 |
| 2,586,367 | 2/1952 | McWilliam | 122/381 |

Primary Examiner— Kenneth W. Sprague
Attorney— C. Emmett Pugh

ABSTRACT: An improved system for mechanically cleaning out boilers by a vortex or centrifuge action which is set up about each of the individual nozzle elements of upper and lower nozzle systems located in the steam and mud drums, respectively, of the boiler. The dimensions, positions, and spacing of the nozzles are critical and ideal blowdown periods and materials are disclosed. Each nozzle is slotted and includes four curved vanes. The vanes can be curved to produce alternate clockwise and counterclockwise vortices.

INVENTOR
WILLIAM M. McWILLIAM

BY *Lake & Pugh*
ATTORNEYS

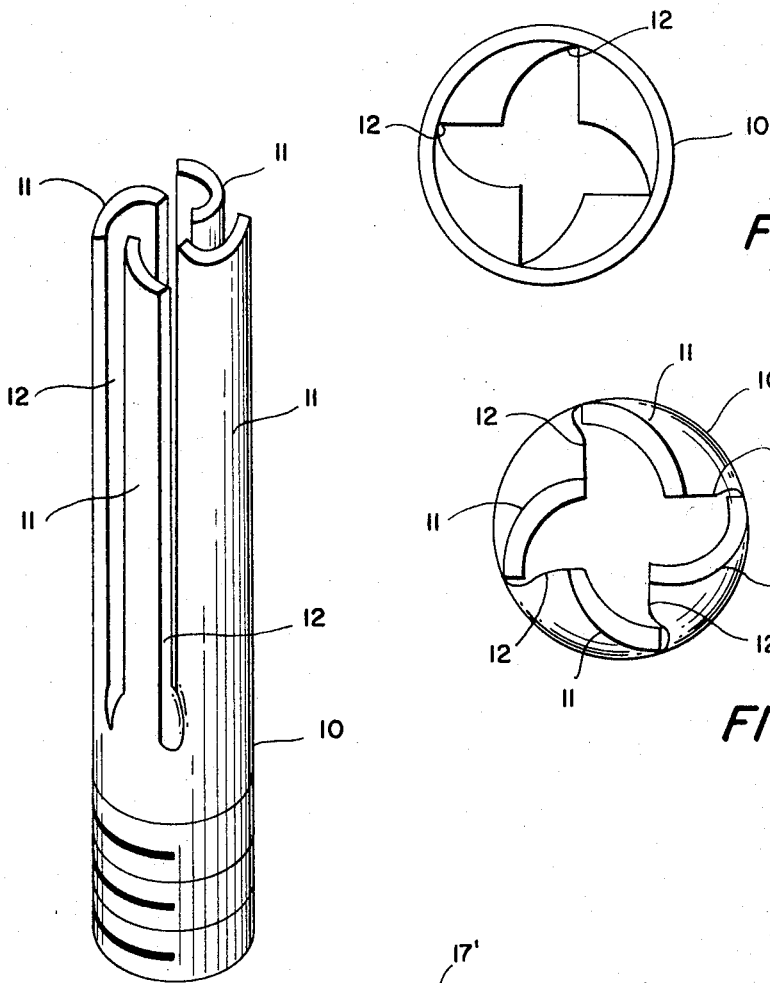
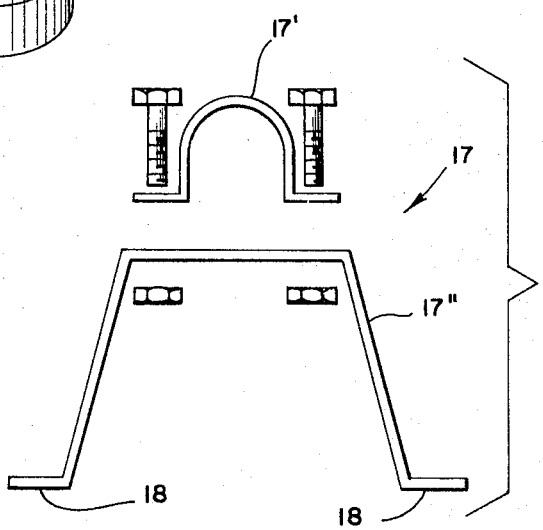

SYSTEM FOR MECHANICALLY CLEANING BOILERS

This invention relates to an improved system of mechanically cleaning a boiler by removing sludge mud, acids, scum, small scale and other foreign matter from the boiler by a vacuum-induced centrifuge action and is directed to improvements made in the basic cleaning system disclosed in applicant's prior Pat. No. 2,586,367, entitled "Boiler Cleaner Nozzle," issued Feb. 19, 1952.

The invention cleans a boiler and keeps it clean without the use of chemicals, compounds, water softeners, and expensive water treating equipment. The use of chemicals to maintain a boiler is only a stopgap method of boiler cleaning with many costly side effects. Compounds dissolved in the steam may crystallize out and deposit on turbine blades. Chemicals destroy gaskets and seals in the boiler system. Aside from the initial cost of chemicals and their necessary injection equipment, their side effects are more expensive and it is still necessary to shut down the boiler and clean it periodically. With the installation of the inventive system, a boiler will never have to be shut down for periodic cleaning. The time, labor and expense of manual, turbine, and inhibited acid cleaning are eliminated with the present invention.

Because boiler scale is an excellent insulator, its presence in a boiler greatly increases costs. The thicker the scale formation, the greater percentage of fuel is wasted. Moreover, it has been found that the accumulation of scale causes the majority of boiler explosions. Compounds only slow down the formation of scale and waste of fuel. The present invention removes old scale and prevents new scale from forming, therefore, it makes a more efficient boiler with a low constant fuel consumption and no waste and with greater safety.

Priming and foaming represent an undesirable and often dangerous condition. Priming is the sudden discharge of large volumes of boiler water into the steam system. Foaming occurs when the water films around steam bubbles are stabilized by impurities in the boiler water. As the concentration of contaminants in the boiler water is reduced by the present invention, priming and foaming are eliminated. Moreover, the invention not only cleans the boiler, it protects expensive steam system equipment such as superheaters, turbines and condensers from dangerous deposits.

Even after the most up-to-date water softening process is used, harmful impurities enter the boiler with the feed water and are precipitated by the heat of the boiler enviornment. The salts that form scale and sludge in a boiler are less soluble in hot water than they are in cold water, and these scale forming precipitants are either heavier or lighter than the boiler water. By gravity separation, the lighter ones form a scum on the water surface in the steam drum, and the heavier ones collect as a sludge in the mud drum. As will be described in detail below, an installation of the inventive device consists of a row of metal vaned nozzles just below the water line in the steam drum and a similar row of shorter vaned nozzles just above the floor of the mud drum or downtake header. The nozzles are all pipe-connected to the blowdown valve. Each vaned nozzle is designed to create a vortex or self-induced centrifuge around itself when the blowdown valve is opened and a pressure differential occurs at the nozzle. It is the function of the upper row of nozzles in the steam drum to further concentrate the solids horizontally. The lighter-than-water solids or scum, including oil and magnesia, on the water surface in the steam drum are naturally forced to the center of the vortex or centrifuge created directly above each nozzle when blowdown occurs. Thus a very high percentage of contaminating solids per volume of boiler water lost is removed from the boiler water surface. These vortex or centrifuge creating nozzles are a vast improvement over the commonly accepted surface skimmer, continuous blow or surface blow. The vortices created by the bottom row of nozzles in the mud drum are stronger than those created in the steam drum. Their function is to put the heavier-than-water sludge into suspension where it can readily be removed through each nozzle during blowdown. In essence, the boiler water is being treated mechanically by selective removal of high percentages of boiler water contaminants per volume of the boiler water lost.

The concentrations of boiler water impurities are successively lowered with each blowdown operation. When these concentrations fall below their saturation points, the less stable solid constituents of existing scale and baked-on sludge will go into solution. The scale forming process in a boiler is reversible depending upon the concentration of impurities in the boiler water. Also, when these concentrations of boiler water impurities are maintained below their saturation points, no new scale or sludge can be precipitated. Moreover, a large percentage of scale is pulverized by the centrifuge action and is blown out of the boiler at each blowdown.

Thus, the invention purifies the boiler water which prevents the formation of new scale and renders existing scale soluble. The pressure differentials and abrasion accompanying the physical action of the vortices assist in dislodging and disintegrating the semi-dissolved existing scale. After removal of the existing scale remnants that collect in the mud drum, no new scale will form.

The invention also controls water side corrosion by purifying the boiler water as described above. Water-side corrosion is electrochemical in nature. The inevitable chemical and physical variations in the surface of the tube metal cause a slight difference in the electrical potential between one area and another. The boiler water acts as the electrolyte. By purifying the boiler water, the invention weakens the ability of the boiler water to function as an electrolyte and thereby controls water-side corrosion of the boiler metal.

The invention thus utilizes forces and conditions within the boiler to make the boiler clean itself. The purging action of the invention occurs with every blowdown. A boiler using the vortex cleaner should be blown down every three hours to realize its full potential. This is a simple operation consisting of raising the water to a full glass, waiting one minute and then blowing down the boiler with the blow-off valves wide open. The water in the boiler is blown down three gauges on the gauge glass.

The basic mechanical system disclosed in applicant's original patent, 2,586,367, although a substantial advance over the art of its time, has been found to be less than perfect and the improvements of the present invention have permitted a fuller and more complete realization of the advantages discussed above. At the heart of these improvements are the diameters and vane lengths of the upper and lower nozzles, the spacing between the nozzles, the positioning of the nozzles, the material of the nozzles, and the period between blowdowns. These detailed improvements in combination have vastly improved the operation, maintenance and results of the mechanical cleaning systems. In the present invention, the vortex or centrifuge action is substantially increased and a greater pressure differential or better relative vacuum is induced as compared to that heretofore achieved.

It is, therefore, a basic object of the present invention to provide an improved mechanical system for cleaning boilers which is far superior in performance and operation than that heretofore known or used.

It is a further object to substantially increase the vortex or centrifuge action and vacuum inducing qualities of the mechanical cleaning system heretofore known.

It is also an ultimate object of the present invention to provide the best method and means of cleaning boilers, a method and means which are far superior to those involving the use of compounds, chemicals or electrolytic devices and even those mechanical ones heretofore known and used.

Other objects and advantages of the invention and a full understanding thereof may be had by referring to the following description and claims taken together with the accompanying drawings, in which:

FIG. 2 is a perspective view of a nozzle of the upper nozzle system;

FIGS. 3A and 3B are bottom and top plan views, respectively of the nozzle of FIG. 2; and FIG. 4 is an exploded front view of a pipe bracket used in the installation of the inventive system.

Figure 1:
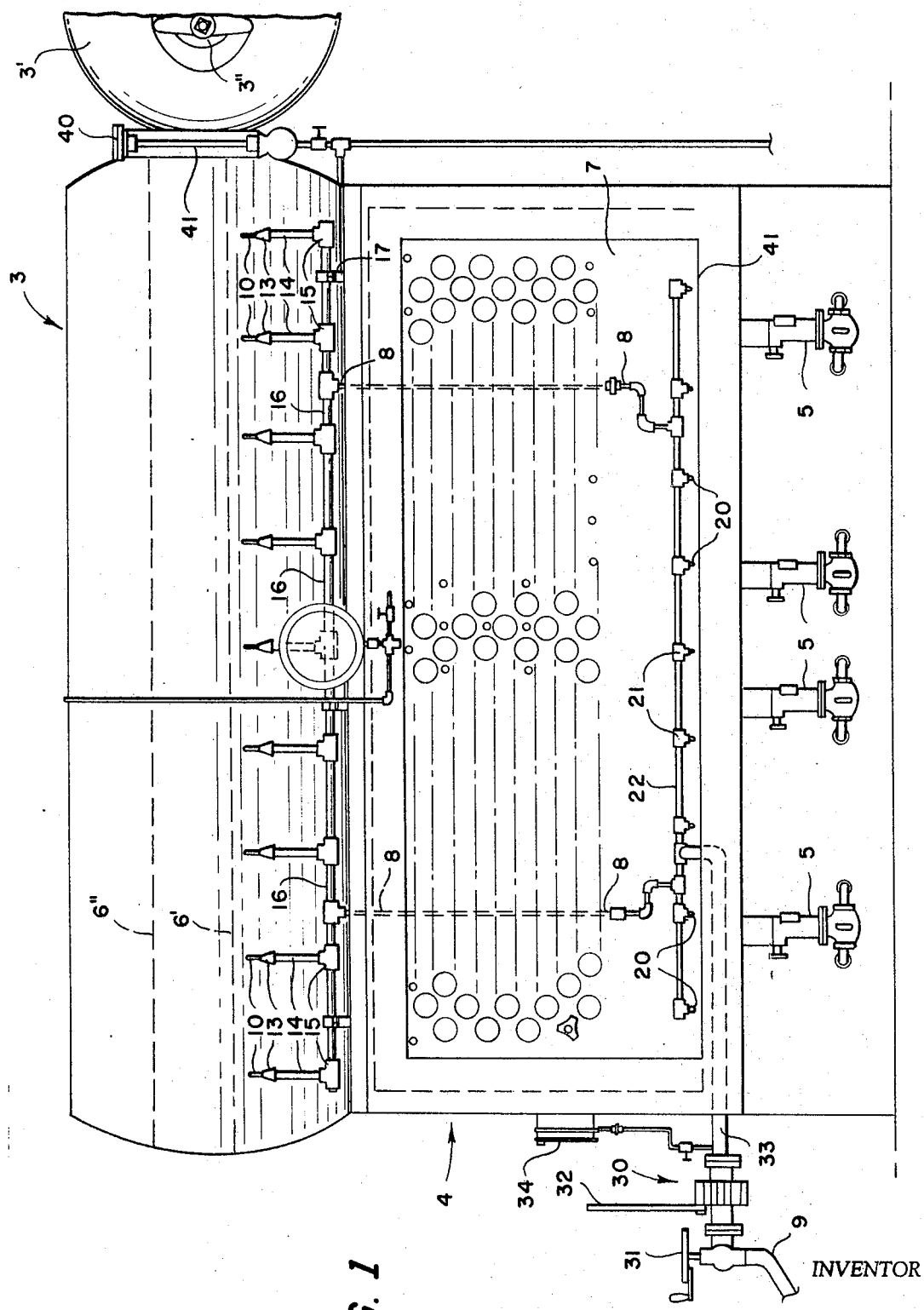
FIG. 1 is a side view, partially cut-away and partially in phantom line, showing the inventive system in a conventional boiler.

A steam boiler of conventional design is shown in FIG. 1 and comprises a cylindrical steam drum 3, a box-like mud drum or leg portion 4 and a tube system element 7 located therein. The steam drum 3 includes an openable end member 31 having a manhole plate 3" in the central area thereof. Water is circulated throughout the steam and mud drums 3, 4 and its level is maintained between a high level maximum 6" and a low level minimum 6'. The details of the boiler form no part of the invention and the latter is applicable to both the water and the fire tube types of boilers. The mechanical cleaning system as installed in the conventional boiler comprises an upper nozzle system 1 located in the steam drum 3 and a lower nozzle system 2 located in the mud drum 4.

The upper and lower nozzle systems 1, 2 are connected together by appropriate piping 8 and the lower nozzle system 2 (and hence the upper nozzle system 1) is connected to a discharge line 9 by means of a blowdown system 30. The boiler is controllably blown down through the upper and lower nozzle systems 1, 2 by opening the blow-off glove valve 31 and the blow-off lever valve 32 and the pressure in the blow-off line 33 is registered and recorded by an appropriate pressure recording meter 34.

It has been found that, if the following dimensions, positions and spacing are used, complete interacting vortices or centrifuges are set up about the individual nozzles 10, 20 during blowdown which produce greatly improved performance and results as compared to systems heretofore known. Hence, these specifics should be considered vital and relatively critical.

The upper nozzle system 1 comprises a series of cylindrical nozzle members 10 having a diameter of a half an inch (½"). As seen in FIGS. 2 and 3, each upper nozzle member 10 has a set of four vanes 11 separated by slots 12 two and one-eighth inches (2⅛") in length and three-thirty-seconds of an inch (3/32") in width which cause a vortex or centrifuge to form when a pressure differential occurs, i.e., during blowdown. Because of the direction of curvature of the vanes 11, a vortex in the clockwise direction (as viewed from the perspective of FIG. 3) is created. To produce intertwining and cooperating vortices as well as interacting vortices, the curvature of the vanes can be opposite for each juxtaposed nozzle and the same for alternate ones. Thus, alternate clockwise and counter-clockwise vortices will be produced. This is true for either the upper or lower nozzles 10, 20.

The cylindrical lower nozzle 20 has vortex-producing vanes and slots similar in general configuration except for its length and relative dimensions as that of the upper nozzle 10. The relatively critical dimensions of the lower nozzle are that it has a diameter of three-quarters of an inch (¾") with slots one and one-eighth of an inch (1⅛") in length and three thirty-seconds of an inch (3/32") in width.

In installation, the upper nozzles are placed with their upper tips within four to five inches (4"—5") of the low water mark 5' and the lower nozzles are located with their lower tips approximately three-quarters to five-eighths of an inch (¾"—⅝") from the bottom plate 4' of the mud drum 4. The nozzles 10, 20 should ideally be made of stainless steel for durability, but copper and Monel have also been found to be suitable.

For installation in boilers in pressure ranges of at least one-hundred-and sixty pounds per square inch (160 psi) but under four hundred pounds per square inch (400 psi), the upper nozzles 10 should be spaced approximately eighteen to twenty-two inches (18"—22") apart for optimum results. For installation in boilers of four hundred pounds per square inch (400 psi) or more, the upper nozzles 10 should be spaced approximately twenty-two to thirty-two inches (22"—32") apart and the lower nozzles 20 sixteen to twenty-four inches (16"—24") apart for optimum results.

As pointed out above, the dimensions, spacing and positioning are relatively critical to obtain optimum results, particularly in boilers having a pressure of one-hundred-and-sixty pounds per square inch (160 psi) or greater during normal operation, however, the particular dimensions may be varied a small amount, for example, by an eighth of an inch (⅛") without substantially altering the advantages to be gotten in the use of the present invention. Hence, the dimensions given and hereinafter claimed should to that degree be considered approximate.

As shown in the prior patent to McWilliam, a disc cap is secured to the end of each of the upper nozzles 10 while the lower nozzles are left open. Details of an installation, considered to be merely exemplary, are as follows. Each of the upper nozzles 10 is mounted via a bell reducer 13 and a one inch (1") pipe 14 and a malable iron T-fitting 15 on a one and a half inch (1½") black wrought iron pipe line 16 located at the bottom of the steam drum 3. The pipe line 16 is secured to the bottom of the steam drum 3 by a set of brackets 17 (shown exploded in FIG. 4). Each bracket 17 comprises flat iron upper and lower members 17', 17" bolted together about the pipe line 16. The bracket 17 is spot welded to the steam drum 3 at the flanges 18.

Each of the lower nozzles 20 is mounted with its open end down via a malable iron T-fitting 21 to a wrought iron one inch (1") pipe line 22, although the pipe line may often be of a larger diameter, for example, one and a half inches (1½") or two inches (2"). The pipe line 22 is secured to the mud drum 4 by brackets, similar to those illustrated in FIG. 4, which are spot welded to the drum.

It has been found that the optimum period for blowdown is approximately every three hours. The record contained in the pressure meter 34 will indicate whether or not such a practice is being followed and as such serve as a safety factor. When blowdown occurs, the upper nozzle system 1 will syphon off the scum oil and magnesia from the surface of the water in the boiler and blow it out via the blowdown system 30. The half inch nozzle 10 creates a greater steam and water circulation and a larger vortex which is more substantial in strength than heretofore achieved. At blowdown, the lower nozzle system 2 will syphon off the sludge mud, acids and small scale from the bottom of the boiler and by doing the same will eliminate any new formation of scale. The convulsing fluid occurring during blowdown between the upper and lower nozzle systems 1, 2 will cause the breaking down of the old scale from anywhere on the interior of the boiler.

Before blowing, the water level should be raised to its high level maximum mark which is at the top of the water column 41 of the water gauge. The blow off valve 31, 32 should then be opened slowly until the valve is wide open. When the water level reaches the one and one half inch (1½") mark on the water column 41, the blow off valve is closed and water fed in until the water level reaches its normal operating level.

Many variations in the exemplary structural details disclosed may be made and the relatively critical details may be varied as noted without departing from the spirit and scope of the present invention and the latter should be measured only by the scope of the claims which follow.

I claim:

1. An improved system for mechanically cleaning boilers having a steam drum (3) and a mud drum (4) or their equivalents containing water under high pressure comprising: an upper nozzle system (1) including a series of upturned nozzles (10), the upper ends of said up-turned nozzles being located in the steam drum at a position within approximately four to five inches below the low water mark minimum (5') and each of said up-turned nozzles comprising a cylindrical member having a diameter of approximately a half an inch, said cylindrical member having at its upper end a series of curved vanes (11) separated from each one another by longitudinal slots (12); a lower nozzle system (2) including a series of down-turned nozzles (20), the lower ends of said turned-down nozzles being located in the mud drum at a position approximately three-quarters to five-eighths of an inch from the bottom of the mud drum and each of said down-turned nozzles comprising a cylindrical member (20) having a diameter of approximately three-quarters of an inch, said cylindrical member having at its lower end a series of curved vanes separated from each other by longitudinal slots; and a blow-off system (30) connecting said upper and lower nozzle systems to the exterior of the boiler; said boiler having a pressure of from one-hundred-and-sixty to four-hundred pounds per square inch of pressure during normal operation and said series of upper nozzles (10) being separated by a distance of approximately eighteen to twenty-two inches and said series of lower nozzles (20) being separated by a distance of approximately twelve to sixteen inches; whereby, when said blow-off system is opened, a pressure differential is created between the interior of the boiler and the interior of the nozzle systems, and whereby the particular dimensions, spacing and positions of the nozzles cause a greater vortex or centrifuge action than that heretofore obtained.

2. An improved system for mechanically cleaning boilers having a steam drum (3) and a mud drum (4) or their equivalents containing water under high pressure comprising: an upper nozzle system (1) including a series of up-turned nozzles (10), the upper ends of said up-turned nozzles being located in the steam drum at a position within approximately four to five inches below the low water mark minimum (5') and each of said up-turned nozzles comprising a cylindrical member having at its upper end a series of curved vanes (11) separated from each other by longitudinal slots (12); a lower nozzle system (2) including a series of down-turned nozzles (20); the lower ends of said turned-down nozzles being located in the mud drum at a position approximately three-quarters to five-eighths of an inch from the bottom of the mud drum and each of said down-turned nozzles comprising a cylindrical member (20) having a diameter of approximately three-quarters of an inch, said cylindrical member having at its low end a series of curved vanes separated from each other by longitudinal slots; and a blow-off system (30) connecting said upper and lower nozzle systems to the exterior of the boiler; said boiler having a pressure of at least four-hundred pounds per square inch during normal operation and said series of upper nozzles (10) being separated by a distance of approximately twenty-two to thirty-two inches and said series of lower nozzles being separated by a distance of approximately sixteen to twenty-four inches; whereby, when said blow-off system is opened, a pressure differential is created between the interior of the boiler and the interior of the nozzle systems, and whereby the particular dimensions, spacing and positions of the nozzles cause a greater vortex or centrifuge action than that heretofore obtained.

3. An improved system for mechanically cleaning boilers having a steam drum (3) and a mud drum (4) or their equivalents containing water under high pressure comprising: an upper nozzle system (1) including a series of up-turned nozzles (10), the upper ends of said up-turned nozzles being located in the steam drum at a position within approximately four to five inches below the low water mark minimum (5') and each of said up-turned nozzles comprising a cylindrical member having at its upper end a series of curved vanes (11) separated from each other by longitudinal slots (12); a lower nozzle system (2) including a series of down-turned nozzles (20); the lower ends of said turned-down nozzles being located in the mud drum at a position approximately three-quarters to five-eighths of an inch from the bottom of the mud drum and each of said down-turned nozzles comprising a cylindrical member (20) having a diameter of approximately three-quarters of an inch, said cylindrical member having at its lower end a series of curved vanes separated from each other by longitudinal slots; and a blow-off system (30) connecting said upper and lower nozzle systems to the exterior of the boiler; said vanes of each of said nozzles of at least one of the nozzle systems being curved in an opposite direction as compared to its neighboring nozzles, whereby the vortices or centrifuges are alternately clockwise and counterclockwise; whereby, when said blow-off system is opened, a pressure differential is created between the interior of the boiler and the interior of the nozzle systems, and whereby the particular dimensions, spacing and positions of the nozzles cause a greater vortex or centrifuge action than that heretofore obtained.

4. An improved system for mechanically cleaning boilers having a steam drum (3) and a mud drum (4) or their equivalents containing water under high pressure comprising: an upper nozzle system (1) including a series of up-turned nozzles (10), the upper ends of said up-turned nozzles being located in the steam drum at a position within approximately four to five inches below the low water mark minimum (5') and each of said up-turned nozzles comprising a cylindrical member having at its upper end a series of curved vanes (11) separated from each other by longitudinal slots (12); a lower nozzle system (2) including a series of down-turned nozzles (20); the lower ends of said turned-down nozzles being located in the mud drum at a position approximately three-quarters to five-eighths of an inch from the bottom of the mud drum and each of said down-turned nozzles comprising a cylindrical member (20) having a diameter of approximately three-quarters of an inch, said cylindrical member having at its lower end a series of curved vanes separated from each other by longitudinal slots; and a blow-off system (30) connecting said upper and lower nozzle systems to the exterior of the boiler; said blow-off system including a pressure recording meter for continuously recording the pressure in said boiler, whereby a safety check can be made of the time interval between blowdowns; whereby, when said blow-off system is opened, a pressure differential is created between the interior of the boiler and the interior of the nozzle systems, and whereby the particular dimensions, spacing and positions of the nozzles cause a greater vortex or centrifuge action than that heretofore obtained.

5. The improved system of claim 1 wherein each of said longitudinal slots (12) of each of said up-turned nozzles (10) is approximately two-and-one-eighth inches in length and three-thirty-seconds of an inch in width.

6. The improved system of claim 1 wherein each of said longitudinal slots of each of said down-turned nozzles (20) is approximately one-and-one-eighth inches in length and three-thirty-seconds of an inch in width.

7. The improved system of claim 1 wherein said blow-off system is actuated approximately every three hours.

8. The improved system of claim 1 wherein, when said blow-off system is actuated, water is first fed into the boiler until the water level reaches its maximum high level mark (5''), the blow-off system is then slowly opened to create a pressure differential in said boiler about said nozzles to thereby discharge foreign matter from the boiler, the blow-off system is then closed when the water level in the boiler reaches approximately an inch and a half, and the water level is then brought up to its normal operating level.

9. The improved system of claim 2 wherein each of said longitudinal slots (12) of each of said up-turned nozzles (10) is approximately two-and-one-eighth inches in length and three-thirty-seconds of an inch in width.

10. The improved system of claim 2 wherein each of said longitudinal slots of each of said down-turned nozzles (20) is approximately one-and-one-eighth inches in length and three-thirty-seconds of an inch in width.

11. The improved system of claim 2 wherein said blow-off system is actuated approximately every three hours.

12. The improved system of claim 3 wherein said blow-off system is actuated approximately every three hours.

13. The improved system of claim 4 wherein said blow-off system is actuated approximately every three hours.

14. The improved system of claim 2 wherein when said blow-off system is actuated, water is first fed into the boiler until the water level reaches its maximum high level mark (5''), the blow-off system is then slowly opened to create a pressure differential in said boiler about said nozzles to thereby discharge foreign matter from the boiler, the blow-off system is then closed when the water level in the boiler reaches approximately an inch and a half, and the water level is then brought up to its normal operating level.

15. The improved system of claim 3 wherein when said blow-off system is actuated, water is first fed into the boiler until the water level reaches its maximum high level mark (5″), the blow-off system is then slowly opened to create a pressure differential in said boiler about said nozzles to thereby discharge foreign matter from the boiler, the blow-off system is then closed when the water level in the boiler reaches approximately an inch and a half, and the water level is then brought up to its normal operating level.

16. The improved system of claim 4 wherein when said blow-off system is actuated, water is first fed into the boiler until the water level reaches its maximum high level mark (5″), the blow-off system is then slowly opened to create a pressure differential in said boiler about said nozzles to thereby discharge foreign matter from the boiler, the blow-off system is then closed when the water level in the boiler reaches approximately an inch and a half, and the water level is then brought up to its normal operating level.